UNITED STATES PATENT OFFICE.

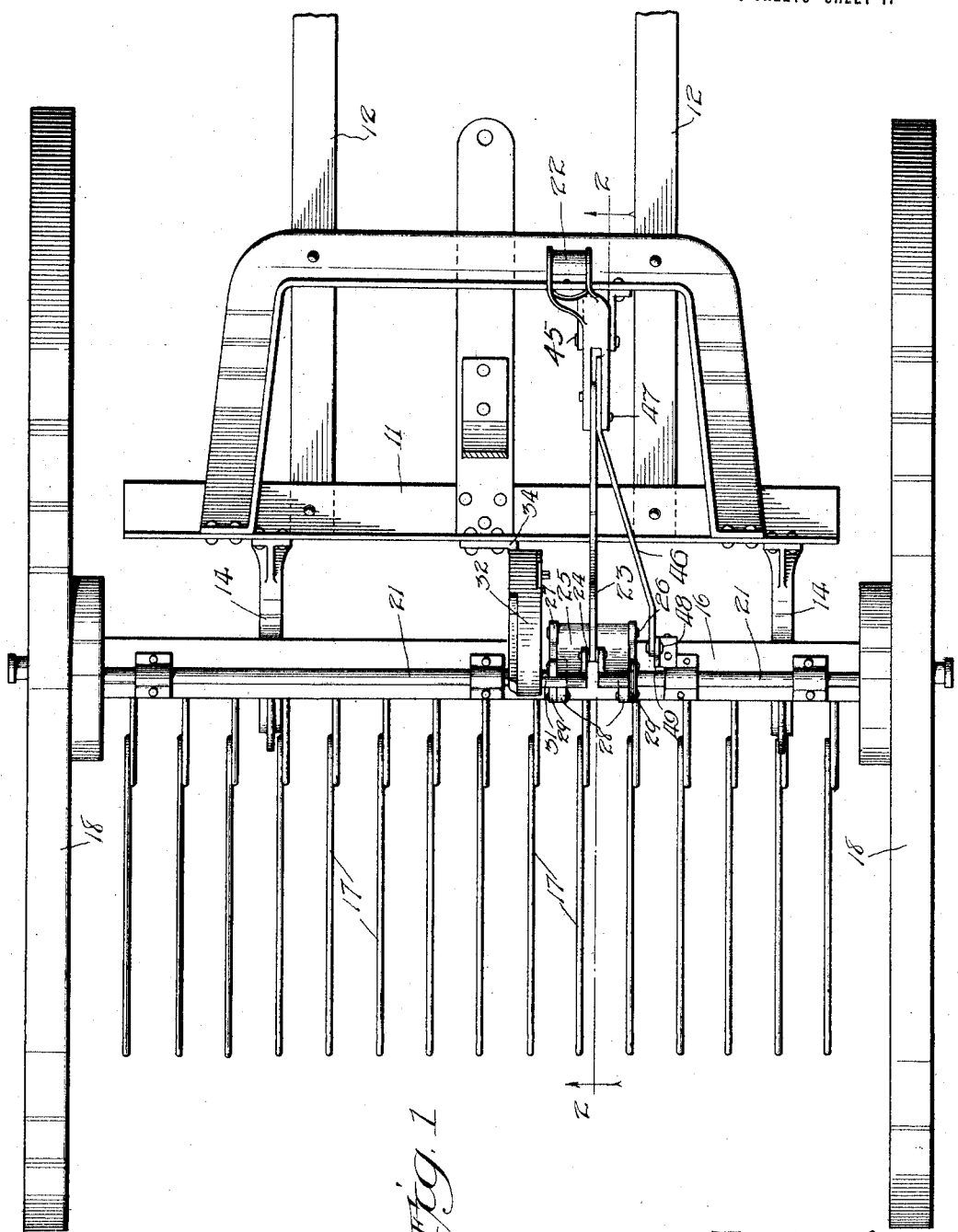

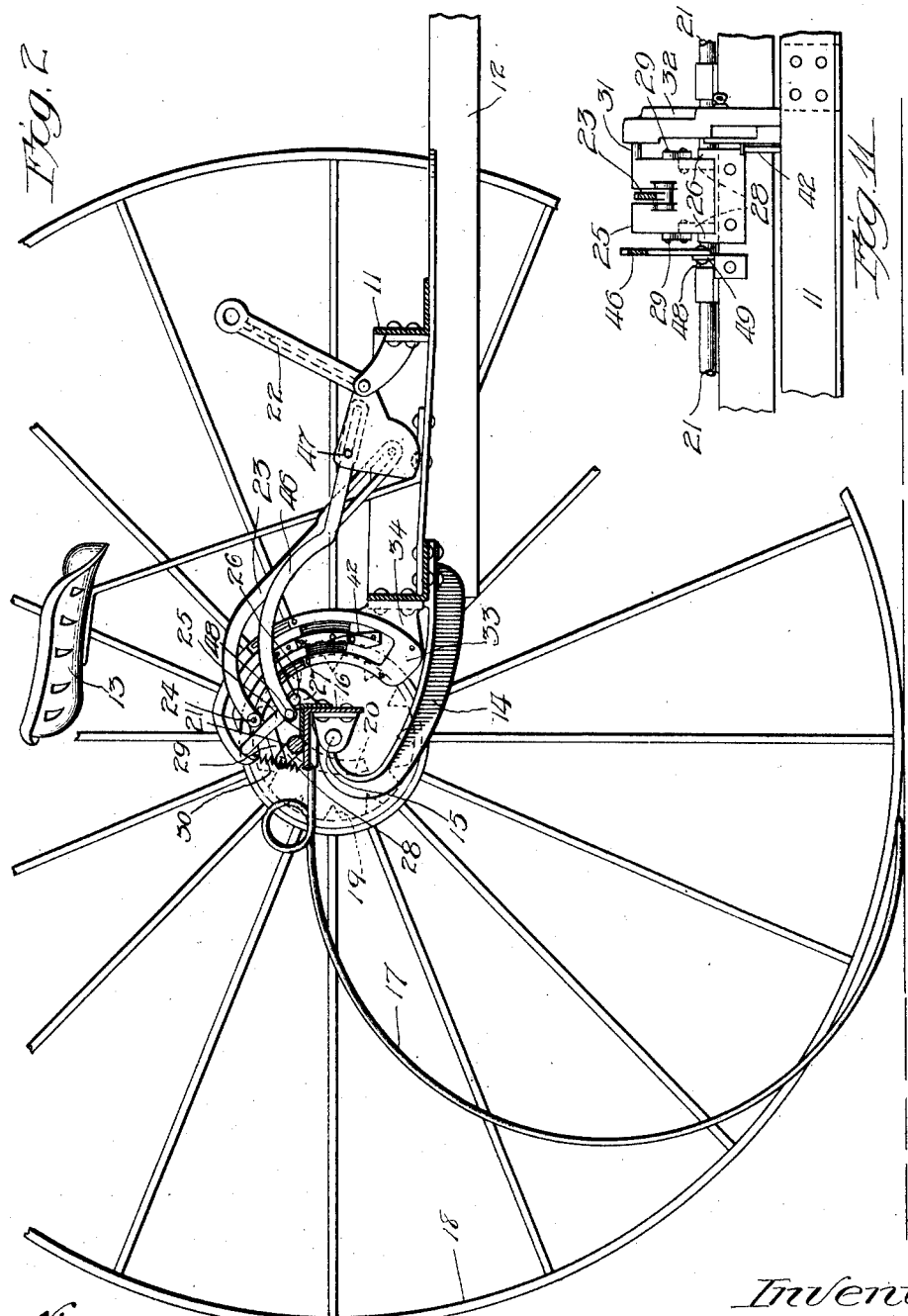

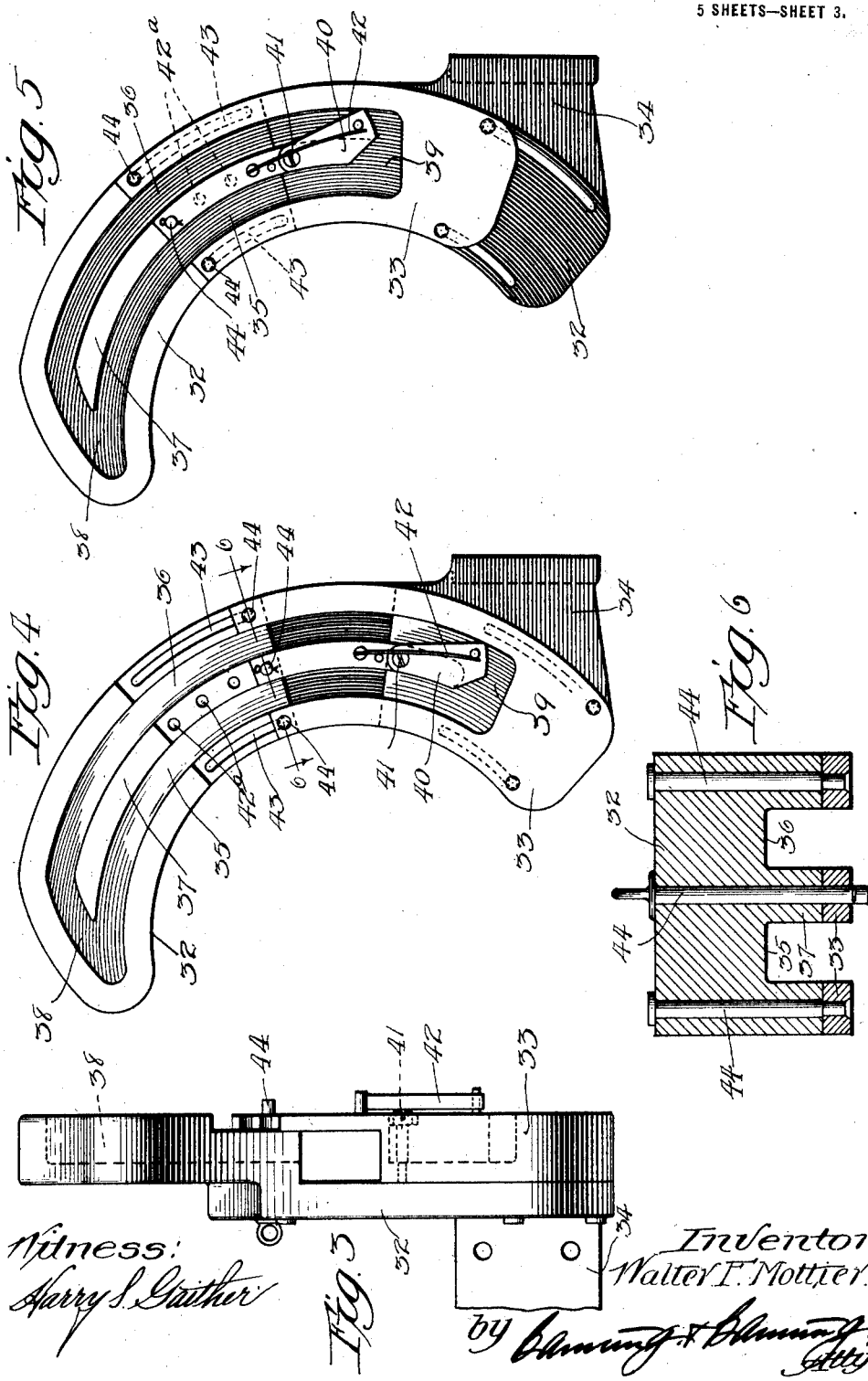

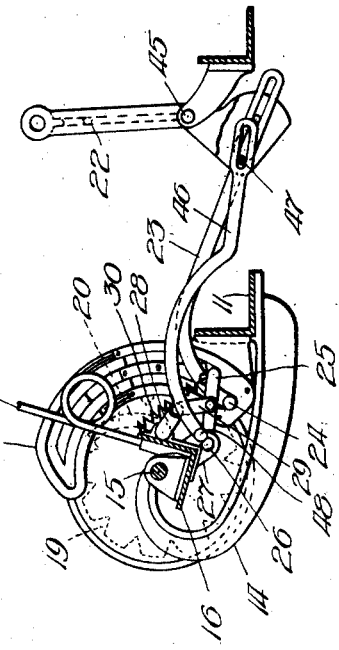
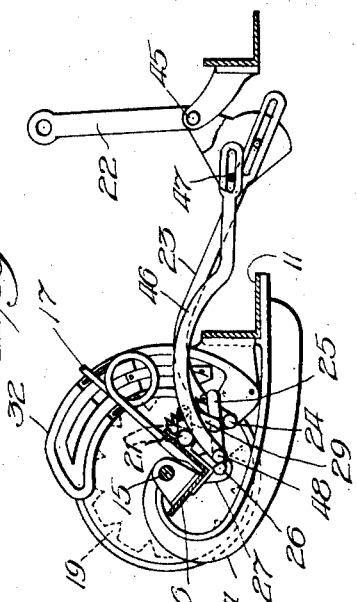
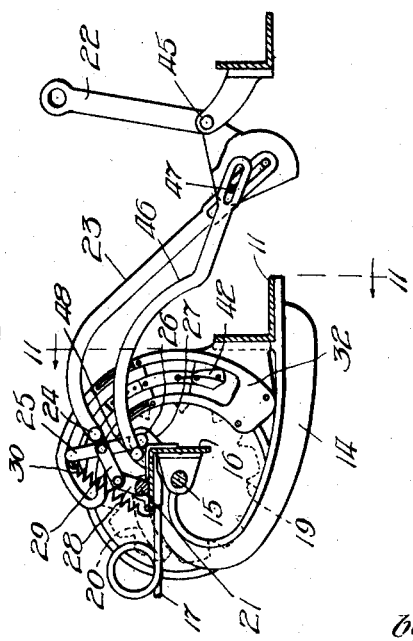
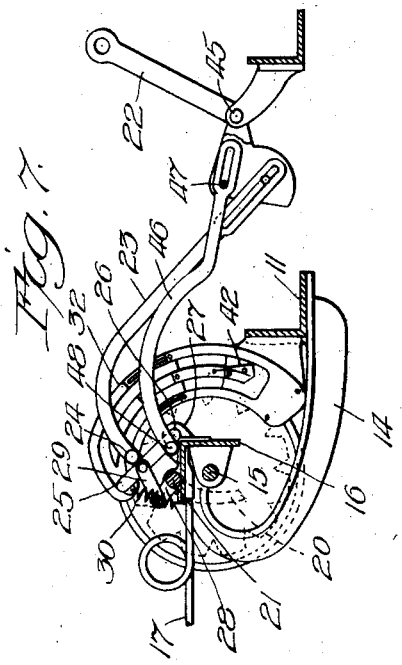

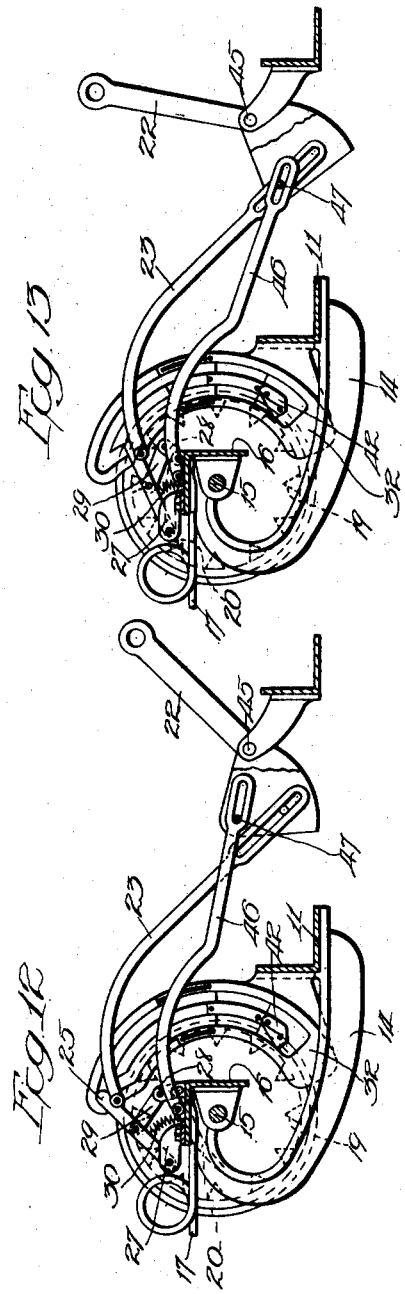
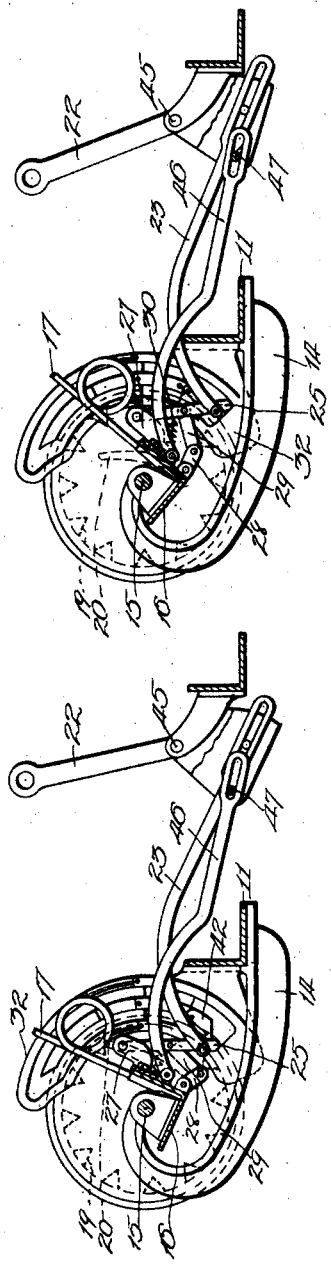

WALTER F. MOTTIER, OF EL CAMPO, TEXAS.

HAY-RAKE.

1,401,274.   Specification of Letters Patent.   Patented Dec. 27, 1921.

Application filed June 26, 1919. Serial No. 306,942.

*To all whom it may concern:*

Be it known that I, WALTER F. MOTTIER, a citizen of the United States, residing at El Campo, in the county of Wharton and State of Texas, have invented certain new and useful Improvements in Hay-Rakes, of which the following is a specification.

This invention has to do with machines for raking hay, alfalfa, etc., and is concerned particularly with certain novel and improved means for governing the dumping movements of the rake. It aims to simplify the operation of the machine by the use of controlling means which may be adapted to different makes of hay rakes. It should, therefore, be understood that my invention relates primarily to a means for controlling the movements of the rake, rather than to the machine in its entirety.

While the principle underlying this invention is susceptible of embodiment in a number of different forms, a preferred construction has been exhibited, by way of illustration, in the accompanying drawings, wherein—

Figure 1 is a plan view of a self-dump hay rake of well known construction, to which is applied the parts that are special of my invention;

Fig. 2 is a longitudinal section through the machine taken on line 2—2 of Fig. 1;

Fig. 3 is an elevation of the concave side of the guideway which controls the movements of the rake actuating means;

Figs. 4 and 5 are side elevations thereof showing different adjustments for varying the length of the guideway;

Fig. 6 is a transverse section therethrough taken on line 6—6 of Fig. 4;

Figs. 7 to 10 inclusive represent diagrammatically the relation of the parts coöperating with the guideway during various stages in the cycle of their movements;

Fig. 11 is a fragmentary section taken on line 11—11 of Fig. 8; and

Figs. 12 to 15 inclusive show diagrammatically a construction wherein certain of the movements are reverse to those of the mechanism shown in Figs. 7 to 10, the modified form being designed for application to certain types of hay rakes having movements somewhat different from the one shown in Figs. 1 and 2.

The part of the present machine which is of well known construction includes a main frame 11 to which thills 12 are secured for draft purposes. A seat 13 is arranged upon the frame for the driver, as shown. Extending rearwardly of the frame are two or more arms 14 so formed as to provide a pivotal mounting as at 15 for an angle bar 16 which serves as a head to which the rake teeth 17 are secured. The arrangement of these parts is such that the rake teeth may lie close to the ground, as shown in Fig. 2, or be raised to the position shown in Figs. 9 and 10, the complete cycle of movement requiring two oscillations as is usual with implements of this kind.

For the purpose of mechanically operating the rake teeth, a clutch connection is arranged between the rake head and the wheels 18 upon which the machine travels. These wheels are each mounted for rotation at opposite ends of the rake head, and each is formed with an inside ratchet 19 with which may engage a dog 20 secured to the outer end of a rod 21 which is rotatably mounted on the rake head. Normally this dog remains disengaged from the ratchet, but is required to engage therewith whenever the rod 21 is rotated for this purpose. It will be noted that each rod 21 is eccentric with respect to the wheels 18 so that engagement of the dogs with the ratchets will necessarily result in locking or clutching the rake head to the wheels for rotation therewith; the rake teeth are thereby raised through a predetermined distance until the dogs are again released from engaging position.

The general construction thus far described has been known in one form or another for a considerable time. In effect it provides simply a lock or clutch between the rake head and wheels such that the teeth will be properly raised to dumping position. The specific means heretofore known for actuating the dogs into and out of engaging position relative to the ratchet teeth have not, however, been entirely satisfactory, owing to the uncertainty of their operation, and the difficult lever manipulations that they have necessitated. It is with this phase of the mechanism that my invention is primarily concerned. The parts now to be described represent a novel and distinct improvement over the actuating means which I have alluded to.

Mounted pivotally upon the frame of the machine as at 45 is a lever 22 which may be operated either by hand or by foot, and if by the latter, preferably equipped with a suitable strap or other device (not shown) for facilitating both push and pull movements. Connecting loosely with the lever is a link 23 which is operatively secured as at 24 to a swinging plate 25 hinged as at 26 between ears 27 which are carried on the rake head. Between this plate and each rod 21, I have arranged a self-adjusting connection consisting of a crank 28, one secured to each rod, and links 29 pivotally attached thereto and to the plate as well. This plate is maintained in normal position, as represented in Fig. 2 under the tension of a spring 30, or other equivalent means, and in this position it will be noted that the dogs 20 are each withheld from engagement with the ratchets.

The plate 25 is provided with a laterally projecting element 31 (see Fig. 11) which may be conveniently in the form of a pin or boss whose function it is to travel within a guideway of peculiar formation. By preference, this guideway, as shown in Figs. 3 to 5 and 7 to 10, consists of two plates 32 and 33, the latter adjustable with respect to the former, to thereby vary the length of the guideway, the plate designated as 32 being formed with a flanged base 34 through which bolts or other securing devices may pass to make fastening with the main frame of the machine. These plates are shaped in the general form of an arc and are recessed in the side adjacent the swinging plate 25 to provide double tracks in the nature of channels, each in the form of an arc in concentric relation to the wheels 18 and to the pivotal connections between the rake head 16 and arms 14 as well. The inside track of this guideway is designated as 35, the outer one as 36, and the wall separating them as 37. In the several figures of the drawings the guideway is shown as mounted in a vertical plane, so that its two tracks have relatively upper and lower ends. A communicating track 38 is provided between the inside and outside tracks at their upper ends, this being preferably in the form of an arc that is concentric with the hinged connection 26 between the swinging plate and the ears 27. At the lower ends of the guideway a connecting track 39 is also provided, as shown. The lower end 40 of the wall 37 which separates the inside and outside tracks, is preferably jointed to swing as at 41, and is under the influence of a spring 42, so that this jointed end acts as a spring gate; that is, it permits the element 31 traveling through the outer track to pass thereby only when proceeding downwardly. The return movement must, of necessity, be made through the inside track.

As already stated the structure of the guideway consists of two plates one fixed relative to the frame of the machine, and the other adjustable with respect thereto. In order that adjustments may be made, I have arranged the walls which define the tracks 32 and 33 with interlapping portions, as shown in Figs. 3 to 5 inclusive, through which are several series of registering openings 42ª and slots 43 to admit locking pins or bolts 44. By this construction the continuity of each track is sufficiently preserved to guide the element 31 that travels therein, and manifestly the length of travel varies according to the nature of the adjustment that is made. In Figs. 3 and 4, for instance, the parts forming the guideway are shown as extended, and in Fig. 5, as contracted, to their respective limits, it being obvious that intermediate adjustments as well may be made.

In the operation of the parts which have been described it will be noted that the element 31 which projects laterally from the swinging plate remains always within one of the tracks of the guideway. The normal position of the element within the guideway is shown in Fig. 2, where it lies at the rearward end of the communicating track 38. The element may be moved to the forward end of this track into line with the outside track 36 by a very slight manipulation of the lever 22 which communicates motion through the link 23 for this purpose,—a chain would answer as well—and causes the plate 25 to be swung slightly farther away from the rake head at the same time. This, in turn, causes the two rods 21 to be rotated sufficiently to bring the dogs 20 into engaging relation with the teeth of the ratchets 19. As the machine is traveling over the ground during these movements, the rake head is locked with the wheels 18 and caused to turn from the position indicated in Fig. 8, to that shown in Fig. 9, the projecting element 31 following the course of the outside track 36 all the while until it has passed through the spring gate near the lower end thereof. Having reached this point, the projecting element lodges against the lower end of the outer track. Continued travel of the machine causes the rake head to go on turning with the ground wheels, but the angle between the swinging plate 25 and the rake head 16 being now constantly reduced (see Fig. 10), the links 29 connecting the swinging plate with the cranks 28 on the rods 21 act to turn those rods sufficiently to disengage the dogs 20 from engagement with the ratchets. The spring 30 is then effective to swing the plate over from the position in Fig. 9 a sufficient distance to bring the traveling element into line with the inside track as shown in Fig. 10. When the parts are so related, the rake is free to descend again of its own accord.

I have further provided means for holding the rake teeth to the ground against pressure, such as is exerted by accumulating hay, and means also for enabling the operator to hold the rake teeth indefinitely in suspended position whenever it is so desired. These means which are controllable by the operator through the same medium which induces the rake head to turn, will now be described.

Referring particularly to Figs. 7 to 10 inclusive, I have shown a link 46 slotted at one end to receive a pin 47 carried by the lever 22, the other end of the link having a pivoted connection as at 48 with an ear 49 upstanding from the rake head. When the rake teeth are close to the ground the parts will be related as in Fig. 7 where it is noted that the pivotal connections 45 and 48 are in substantial straight line relation with the pin 47. To insure this relation any suitable stop (not shown) may be employed to limit the forward movement of the lever 22. According to this construction, no dumping movements are possible so long as the lever 22 remains in the position shown. When the lever is drawn toward the operator for the purpose of transmitting movement through the link 23, the pin 47 is likewise moved out of line with the pivotal points 45 and 48 so as to avoid interfering with turning movement of the rake head. It should be noted, furthermore, that the slot in which the pin 47 is situated is so designed as to present one of its ends to the pin when the parts are related as in Fig. 7, but not to interfere thereafter with turning movements of the rake head when the lever 22 has been pulled to break up the straight line relation between the pivotal points 45 and 48 and pin 47 therebetween. When the rake teeth are elevated to either of the positions shown in Figs. 9 or 10, the pin 47 may again be brought close to the rearward end of the slot, so as to stop descent of the rake teeth, if proper pushing pressure be applied to the lever 22. It is only when the operator withholds pressure from this lever that the rake head is free through its own weight to execute a return movement to thereby let the rake teeth down upon the ground. It is an important feature of this invention that the same means which serve to start dumping movements may be used to prevent such movements as well as to check return of the rake teeth to the ground.

In this connection it will be observed that the description and drawing has dealt only with a rake wherein the boss 31 of the swinging plate 25 travels through a double track guideway starting from the top, and following a right hand course. With certain types of hay rake, however, a reverse movement would have to be employed, through the use of a modified arrangement of parts such, for instance, as are shown in Figs. 12 to 15 inclusive. Reference numerals the same as those used in Figs. 8 to 10 inclusive have been applied to the corresponding parts exhibited in Figs. 12 to 15 inclusive. No special modifications of these parts have been made, however, only slightly different arrangements to effect a reverse movement as will now be explained.

In the operation of the mechanism shown in Figs. 12 to 15, the element projecting laterally from the swinging plate 25 into the double track guideway is first caused to move downwardly against the tension of a push spring 30 from the position shown in Fig. 12 to that indicated in Fig. 13, this movement being accomplished by a pull exerted upon the lever 22. With this initial change in angular position of the swinging plate 25, the dog 20 is brought into locking relation with the ratchet 19 so as to lock the rake head to the wheels. As the machine continues to travel over the ground, the rake head is turned to the position indicated in Fig. 14, where the element projecting laterally from the swinging plate 25 reaches the lower end of the inside track of the guideway, being required near the completion of this movement to pass through the gate which is under the influence of the spring 42. Having reached this point, the projecting element remains lodged against the lower end of the inside track. Continued travel of the machine causes the rake head to go on turning with the ground wheels, but the angle between the swinging plate and rake head being now constantly enlarged, (see Fig. 15) the links 29 connecting the swinging plate with the cranks 28 on the rods 21 act to turn these rods sufficiently to disengage the dogs 20 from engagement with the ratchets. The spring 30 is then effective to swing the plate over from the position in Fig. 15 a sufficient distance to bring the traveling element into line with the outside track, as shown in Fig. 15. When the parts are so related the rake head is free to descend again of its own accord, except when the operator presses against the lever 22 to prevent such movement.

In the construction described, it will be noted that the dumping movements of the rake are accomplished through the actuation of certain elements which are positive in their operation. Unlike certain machines with which I am familiar, the dogs which make engagement with the ratchet teeth are positively held in disengaged position except at those times when the rake head is to be turned; and during the return movements of the rake head the dogs are positively withheld from engagement with the ratchet teeth until the lever is again manipulated to start the projecting element from its normal position of rest to one where the rake head becomes locked with the wheels.

In this invention it will be noted that provision has been made for interlocking the rake head and wheels in a positive manner during the entire operation of raising the rake teeth, and for preventing just as positively an interlock at all other times.

In the description and illustration of the present hay rake, I have not seen fit to describe certain parts which may be used in conjunction with the mechanism as a whole and which have no direct relation to my invention. It will be apparent, of course, that my invention is susceptible of embodiment in forms which depart from the precise one which I have illustrated as a preferred construction, and in respect of such modifications as are described in the following claims, I desire that they should be included in the scope of this patent.

I claim:

1. The combination with a self dump hay rake having a frame, ground wheels, a rake head, and a clutch between the rake head and the wheels, of a clutch controlling means movably mounted upon the rake head, means for actuating the clutch controlling means to thereby clutch the rake head to the wheels, means carried by the frame acting positively upon the clutch controlling means to prevent unclutching of the rake head from the wheels through a predetermined cycle of movement, and means for unclutching the rake head from the wheels at the completion of a predetermined cycle of movement, substantially as described.

2. The combination with a self dump hay rake having a frame, ground wheels, a rake head, and a clutch between the rake head and the wheels, of a clutch controlling means movably mounted upon the rake head, means for actuating the clutch controlling means to thereby clutch the rake head to the wheels, and means carried by the frame acting positively upon the clutch controlling means to prevent unclutching of the rake head from the wheels through a predetermined cycle of movement, substantially as described.

3. The combination with a self dump hay rake having a frame, ground wheels, a rake head, and a clutch between the rake head and the wheels, of a clutch controlling means pivotally mounted upon the rake head and adapted when moved into one angular position relative thereto to clutch the rake head to the wheels, and when moved to another angular position relative thereto to unclutch the rake head from the wheels, means carried by the frame acting positively upon the clutch controlling means to maintain the same in a fixed angular position relative to the rake head during rotation thereof, and means for changing the angular position of the clutch controlling means at a predetermined point in the rotary movement of the rake head whereby the same is unclutched from the wheels, substantially as described.

4. The combination with a self dump hay rake having a frame, ground wheels, a rake head, and a clutch between the rake head and the wheels, of a clutch controlling means movably mounted upon the rake head, means for imparting to the clutch controlling means an initial movement to thereby clutch the rake head to the wheels, and other means carried by the frame, including a guideway to which the clutch controlling means is operatively related, acting positively to retain the clutch controlling means in a fixed position relative to the rake head during rotation of the latter whereby the rake head is maintained in clutched relation to the wheels through a predetermined cycle of movement, substantially as described.

5. The combination with a self-dump hay rake having a frame, ground wheels, a rake head, and means for locking the rake head to rotate with the ground wheels, of a member having connection with the locking means and pivoted to the rake head, the member when swung into one angular position upon the rake head being arranged to actuate the locking means, and when swung into another angular position upon the rake head to retract the locking means, means for normally maintaining the member in non-actuating position, means under the control of the operator for swinging said member into actuating position whereby the rake head is caused to rotate with the wheels, means for positively maintaining said member in actuating position during rotation of the rake head through a predetermined distance, means for restoring the member to non-actuating position at the completion of rotation of the rake head, and means for maintaining the member in non-actuating position during the return movement of the rake head, substantially as described.

6. The combination with a self-dump hay rake having a frame, ground wheels, a rake head, and dog and ratchet mechanism for locking the rake head to rotate with the wheels, of means for swinging the dog into and out of engaging position relative to the ratchet, consisting of a rod to which the dog is secured mounted for rotation upon the rake head, means carried by the rake head for rotating the rod to swing the dog into and out of engaging position, and means carried by the frame coöperating with the rod rotating means for positively holding the dog in engaging position during rotation of the rake head through a predetermined distance, said means operating also to positively hold the dog in disengaging position through the entire return movement of the rake head, substantially as described.

7. The combination with a self-dump hay rake having a frame, ground wheels, a rake head, and means for locking the rake head to rotate with the wheels, of a mechanism for controlling the action of the locking means comprising an actuating member therefor mounted on the rake head and movable relative thereto to establish or disestablish the locking connection between the rake head and the wheels, and positively acting means for holding the member in actuated position to maintain the locking connection during rotation of the rake head through a predetermined distance, substantially as described.

8. The combination with a self-dump hay rake having a frame, ground wheels, a rake head, and means for locking the rake head to rotate with the wheels, of a mechanism for controlling the action of the locking means comprising an actuating member therefor mounted on the rake head and movable relative thereto to establish or disestablish the locking connection between the rake head and the wheels, and positively acting means for holding the member in actuated position to maintain the locking connection during rotation of the rake head through a predetermined distance, said means operating also to positively hold the member in non-actuating position during the return movement of the rake head, substantially as described.

9. The combination with a self-dump hay rake having a frame, ground wheels, a rake head, and means for locking the rake head to rotate with the wheels, of a mechanism for controlling the action of the locking means comprising an actuating member therefor mounted on the rake head and movable relative thereto to establish or disestablish the locking connection between the rake head and the wheels, and positively acting means for holding the member in actuated position to maintain the locking connection during rotation of the rake head through a predetermined distance, said means operating positively at the completion of rotation of the rake head to move the member into non-actuating position whereby the locking connection between the rake head and the wheels is automatically disestablished, substantially as described.

10. The combination with a self-dump hay rake having a frame, ground wheels, a rake head, and means for locking the rake head to rotate with the wheels, of means for controlling the action of the locking means and having connection therewith, the controlling means being carried on the rake head in movable relation thereto whereby its movements affect the action of the locking means, and means carried on the frame coöperating with the controlling means and acting positively to hold the same in actuating position during rotation of the rake head, and acting also to determine the distance through which the rake head is rotated, substantially as described.

11. The combination with a self-dump hay rake having a frame, ground wheels, a rake head, and means for locking the rake head to rotate with the wheels, of means for controlling the action of the locking means and having connection therewith, comprising a member mounted on the rake head and movable relative thereto, and a second member in the nature of a guideway coöperating therewith and secured immovably to the frame and adapted to maintain the first member in a fixed position of adjustment relative to the rake head during rotary movements thereof, and means for shifting the position of the first member relative to the rake head and to the second member whereby the locking connection between the rake head and the wheels is established, the second member serving independently to maintain the first member in shifted position during rotary movement of the rake head, and to retract the member at the completion of such movement, substantially as described.

12. The combination with a self-dump hay rake having a frame, ground wheels, a rake head, and means for locking the rake head to rotate with the wheels, of means for actuating the locking means into and out of operative position comprising a member secured to the rake head and movable relative thereto, and a second member coöperating therewith in the nature of a guideway secured to the frame, the first member being adapted during rotary movements of the rake head to execute a four-way movement within a path formed in the second member and the second member being extensible to vary the length of such path whereby the extent of rotary movement of the rake head is also varied, substantially as described.

13. The combination with a self-dump hay rake having a frame, ground wheels, a rake head, and means for locking the rake head to rotate with the wheels, of a single manually operated means adapted both for actuating the locking means and for preventing dumping movements when the rake head is unlocked relative to the wheels, and adapted also to permit dumping movements of the rake head when the latter is locked with the wheels, said manually operated means being operable to prevent return movements of the rake head at the completion of the dumping movement, substantially as described.

14. The combination with a self dump hay rake having a frame, ground wheels, a rake head, and a clutch between the rake head and the wheels, of a clutch controlling means movably mounted upon the rake head, a manual operating means therefor connected therewith and mounted upon the frame, and means associated with the manual operating means and controlled thereby for preventing rotation of the rake head when the operating means is in one position, and for permitting such rotation when the manual operating means is in a second position, in the latter of which it also acts to clutch the rake head to the wheels, substantially as described.

15. The combination with a self dump hay rake having a frame, ground wheels, a rake head, and a clutch between the rake head and the wheels, of a clutch controlling means including a lever pivoted to the frame, and a connection between said lever and the clutch, the connection acting also to prevent rotation of the rake head when the lever is in one position, but permitting such rotation when the lever is in another position in the latter of which the connection operates also to clutch the rake head to the wheels, substantially as described.

16. The combination with a self-dump hay rake having a frame, ground wheels, a rake head, and means carried by the rake head for locking the rake head to rotate with the wheels, of manually operated means for actuating the locking means consisting of a lever pivoted to the frame, a link connecting the lever with the locking means carried on the rake head and adapted to actuate the same when the lever is moved in one direction, and a second link connecting the lever with the rake head adapted positively to prevent actuation of the locking means when the lever is held in a predetermined position, substantially as described.

17. The combination with a self-dump hay rake having a frame, ground wheels, a rake head, and means carried by the rake head for locking the rake head to rotate with the wheels, of manually operated means for actuating the locking means consisting of a lever pivoted to the frame and two links each having a slip connection with the lever, one such link having connection also with the locking means and the other with the rake head at a point eccentric of its axis of rotation such as to prevent movement of the rake head when the lever is in a predetermined position and to permit rotation of the rake head when the lever is moved to another position, the movement of the lever to such other position operating through the first link to actuate the locking means whereby the rake head is caused to rotate with the wheels, substantially as described.

18. The combination with a self-dump hay rake having a frame, ground wheels, a rake head, and means carried by the rake head for locking the rake head to rotate with the wheels, of manually operated means for actuating the locking means consisting of a lever pivoted to the frame, and two means of connection extending from the lever, one to the locking means and the other to the rake head, the latter acting as a lock to prevent rotation of the rake head with the wheels when the lever is in predetermined position but to permit such rotation when the lever is moved to another position, and the former means of connection operating when the lever is in such other position to actuate the locking means whereby the rake head is caused to rotate with the wheels, substantially as described.

19. The combination with a self dump hay rake having a frame, ground wheels, a rake head, and a clutch between the rake head and the wheels, of a clutch controlling means, a manual operating means therefor including a lever pivoted to the frame, a connection extending from the lever to the clutch controlling means, and a second connection extending from the lever to the rake head, the latter of which operates to prevent rotation thereof when the lever is in one position but permits rotation thereof when the lever is in another position, the former connection being adapted to clutch the rake head to the wheels only when the lever is in the last mentioned position, one of said connections being operable to prevent return movement of the rake head after completion of one oscillatory movement thereof, substantially as described.

20. The combination with a self-dump hay rake having a frame, ground wheels, a rake head, and means carried by the rake head for locking the rake head to rotate with the wheels, of manually operated means for actuating the locking means consisting of a lever pivoted to the frame, a means of connection in the form of a link pivoted to the lever and to the rake head eccentrically of its axis of rotation, the pivotal centers of the lever and two ends of the link being adapted for alinement when the lever is in a predetermined position whereby the rake head is prevented from rotating, and a second means of connection between the same lever and the rake head adapted with movement of the lever to actuate the locking means whereby the rake head is caused to rotate with the wheels, the two connecting means being completely controllable by a single lever and being so mounted as not to interfere with each other during movements of the rake head, substantially as described.

21. In a self-dump hay rake having a frame, ground wheels, a rake head, and means for locking the rake head to rotate with the wheels, the combination of a first means carried by the frame for normally locking the rake head against rotation relative to the frame, and a second means for actuating the locking means to cause the rake head to rotate with the wheels, and a common control device to which both said first and second means are connected, said control device operating simultaneously to unlock the rake head relative to the frame and to lock the rake head relative to the wheels, said first means acting also through the medium of the control device to oppose return movement of the rake head at the completion of its forward oscillatory stroke, substantially as described.

22. The combination with a self dump hay rake having a frame, ground wheels, a rake head, and a clutch between the rake head and the wheels, of a clutch controlling means movably mounted upon the rake head, and a single manual operating device therefor carried by the frame including means for holding the clutch controlling means in actuated position during one oscillation of the rake head, means for retracting the clutch controlling means from actuating position at the completion of said oscillation, means for permitting at will return oscillatory movement of the rake head, and means for normally withholding the clutch controlling means from actuated position when the rake head has completed its full cycle of movement, substantially as described.

23. The combination with a self dump hay rake having a frame, ground wheels, a rake head, and a clutch between the rake head and the wheels, of a clutch controlling means movably mounted upon the rake head, and a single manual operating device therefor including a guide fixedly secured relative to the frame and acting positively to hold the clutch controlling means in actuated position during the first oscillatory movement of the rake head and in non-actuated position during the return oscillating movement of the rake head, there being means for automatically shifting the clutch controlling means from one position to the other at the completion of the first oscillation of the rake head, substantially as described.

24. In combination with a self dump hay rake having a frame, ground wheels, a rake head, and a clutch between the rake head and the wheels, of a clutch controlling means movably mounted upon the rake head, and a manual operating device therefor including a guide fixedly secured relative to the frame and in operative relation to the clutch controlling means such that the latter is held in one position during the first oscillatory movement of the rake head and in a second position during the return oscillatory movement of the rake head, the first position of the clutch controlling means effecting a lock between the rake head and the wheels and the second position effecting a release of the lock between the rake head and the wheels, there being means for changing the position of the clutch controlling means at the completion of the first oscillatory movement of the rake head, substantially as described.

25. The combination with a self dump hay rake having a frame, ground wheels, a rake head, and a clutch between the rake head and the wheels, of a clutch controlling means movably mounted upon the rake head, a device secured to the frame in operative relation to the clutch controlling means and formed to present two guideways with which the clutch controlling means co-operates to maintain the latter in one position during the first oscillatory movement and in a second position during the return oscillatory movement of the rake head, means for automatically shifting the position of the clutch controlling means from one guideway to the other at the completion of the first oscillatory movement, and manual operating means for shifting the position of the clutch controlling means back into the first guideway only after the rake head has completed its full cycle of movement, substantially as described.

26. In a self dump hay rake, the combination of a frame, a rake head, ground wheels, a co-axial connection therebetween, a member pivoted to the rake head eccentrically of its axis of rotation, an element carried by the member adapted with swinging movements thereof to move toward or from the axis of rotation of the rake head, a guideway stationary with respect to the frame formed to present two arcuate paths each concentric with the axis of rotation of the rake head, one path being situated therefrom a greater radial distance than the other, manually operated means for swinging the element from one path of the guideway into the other, a clutch between the rake head and the wheels, a connection between the clutch and the member such that the rake head is locked to the wheels when the element is positioned in one path of the guideway and is unlocked when the element is positioned in the other path of the guideway, the element being free to travel therein as the rake head is rotated, means arranged in the guideway adapted to permit travel of the element therethrough in one direction only, means for arresting travel of the element when the same has passed said means whereby the member is swung back into the other path of the guideway and the rake head is freed from clutching relation with the wheels, the rake head being thereupon free to reverse its rotation to return to starting position, substantially as described.

27. In a self dump hay rake, the combination of a rake head and ground wheels rotatably mounted thereupon, a guideway carried by the rake formed to present two arcuate paths each concentric with the axis of the ground wheels, one path being situated therefrom a greater radial distance than the other, a clutch between the rake head and the wheels, an element carried by the rake, adapted to travel within the guideway first through one path and then the other, a connection between said element and the clutch such that the rake head is locked to the wheels when the element is positioned in one path of the guideway but is unlocked when the element is positioned in the other path of the guideway, means for effecting relative movement between the element and the guideway so as to shift the element into either path of the guideway, means for arresting travel of the element when the same has reached the end of said path wherein the wheels are clutched to the rake head, the connection between said element and the clutch being such as to cause relative movement between the element and the guideway when the element is arrested in its travel, whereby the element is shifted into the other path of the guideway, and a spring gate for preventing the return travel of the element through the guideway path first traversed, substantially as described.

28. In a self dump hay rake, the combination of a rake head and ground wheels rotatably mounted thereupon, a guideway carried by the rake formed to present two arcuate paths each concentric with the axis of the ground wheels, one path being situated therefrom a greater radial distance than the other, a clutch between the rake head and the wheels, an element carried by the rake adapted to travel within the guideway first through one path and then the other, a connection between said element and the clutch such that the rake head is locked to the wheels when the element is positioned in one path of the guideway but is unlocked when the element is positioned in the other path of the guideway, means for effecting relative movement between the element and the guideway so as to shift the element into either path of the guideway, and means for arresting travel of the element when the same has reached the end of said path wherein the wheels are clutched to the rake head, the connection between said element and the clutch being such as to cause relative movement between the element and the guideway when the element is arrested in its travel, whereby the element is shifted into the other path of the guideway, substantially as described.

WALTER F. MOTTIER.

Witness:
B. S. WRIGHT.